Sept. 19, 1933.  H. A. SOMMERS ET AL  1,927,507
HIGH PRESSURE COMPRESSOR PACKING
Filed Sept. 10, 1930  2 Sheets-Sheet 1
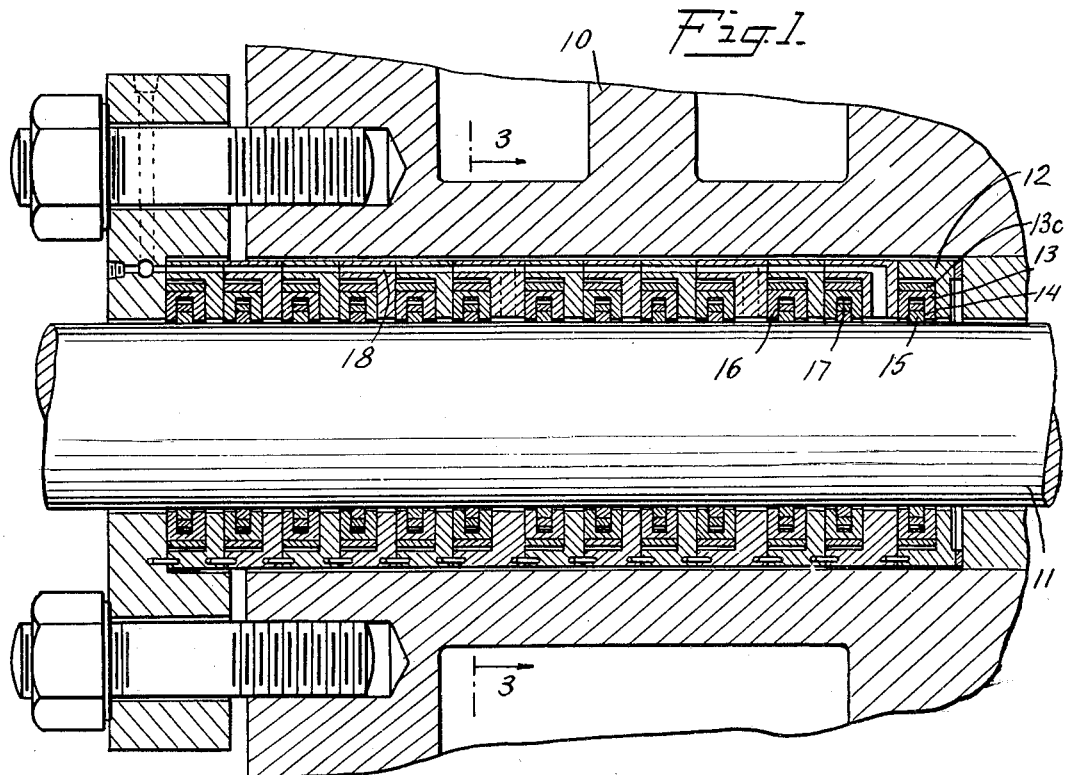
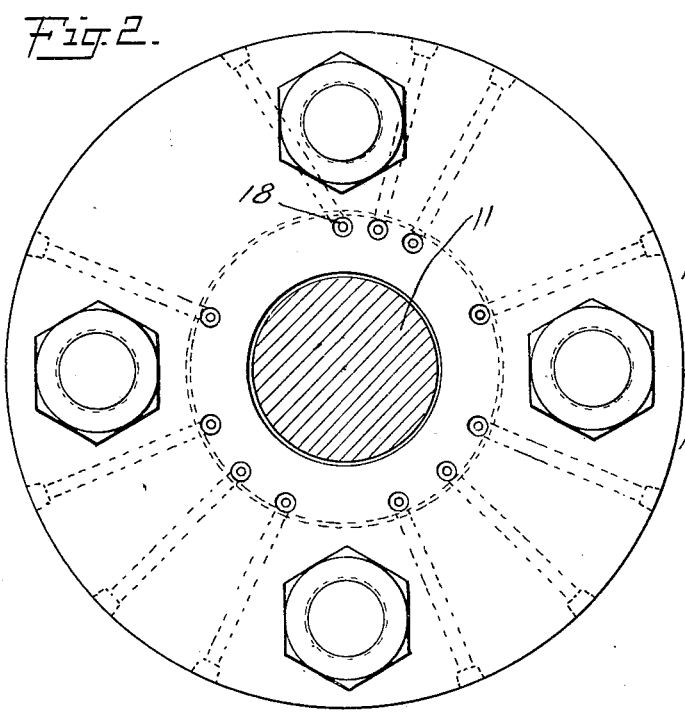
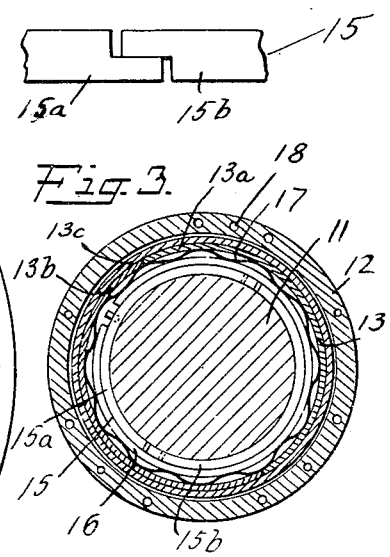
INVENTORS
Howard A. Sommers
George J. McInnis
BY
Rimie Davis Marion Edmond
ATTORNEYS Sept. 19, 1933.  H. A. SOMMERS ET AL  1,927,507
HIGH PRESSURE COMPRESSOR PACKING
Filed Sept. 10, 1930   2 Sheets-Sheet 2
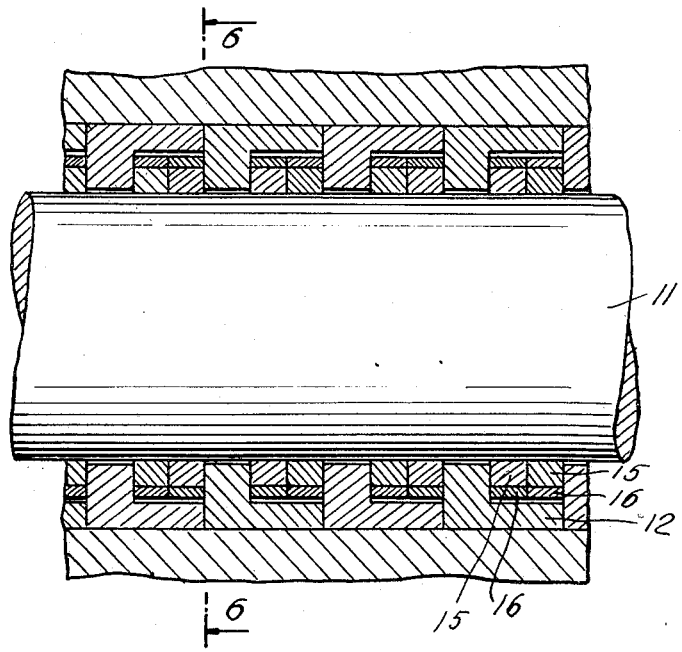
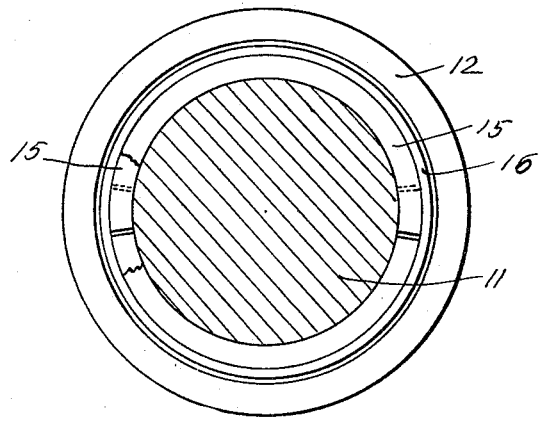

Patented Sept. 19, 1933

1,927,507

UNITED STATES PATENT OFFICE 1,927,507

HIGH PRESSURE COMPRESSOR PACKING

Howard A. Sommers and George J. McInnis, Niagara Falls, N. Y.

Application September 10, 1930
Serial No. 480,866

10 Claims. (Cl. 286—24)

This invention relates to metal packings of the type used for packing the moving rod of a compressor, valve stem, or the like. More specifically the invention is concerned with a packing construction for a compressor rod, which includes metal packing rings and other associated parts, and which is so constructed as to provide the desired sealing effect under high pressures. The packing construction of the invention has been adapted with marked success to compressors for synthetic ammonia manufacture, and an embodiment of the invention applicable for that purpose will be described in detail, although it is to be understood that the utility of the invention is by no means limited to that particular use, but is general.

In synthetic ammonia plants, the gas is compressed in a series of stages, and in the fifth stage, for example, the suction pressures may run up to 800 pounds per square inch and the discharge pressures as high as 2,000 pounds, depending on the capacity at which the compressors are run. In other parts of the process, compressors must be packed at pressures of 4500 pounds or more. Sealing the moving rod of the compressor under the conditions mentioned presents a serious problem. Heretofore, the conventional construction included a series of steel cups or packing cases, each containing a pair of metal packing rings lying side by side. Both these rings were made up of a plurality of arcuate parts, the parts having their end surfaces in one instance, cut radial, and in the other instance cut tangential, and the rings were encircled by light garter springs, which, together with the pressure, held the rings against the rod.

Packing of this construction has proved highly unsatisfactory by reason of the variable results obtained, and much trouble was experienced due to scoring of the rods and packing, leakage, etc. The scoring referred to proved not to be the simple grooving and marking of the rod usually encountered but involved deposition of the packing metal upon the surface of the rod giving it a hard, rough, spotted surface which quickly rasped out the rings and resulted in immediate leakage.

This scoring is due to high bearing pressures of the packing on the rod and is of greater magnitude, the higher the pressure. It is also a function of the thickness of the ring. A simple calculation will show the unit bearing pressure of the seal ring on the rod in any packing case. It is the pressure existing in that case multiplied by the outside area of the ring divided by the area in contact with the rod. The minimum pressure is obtained when the ring has the minimum thickness consistent with strength and wear considerations.

In order to overcome these difficulties, we have devised a packing construction in which each case contains one or more seal rings which are much thinner than the rings heretofore used for the purpose. In one embodiment of the invention, each case contains a single seal ring with associated parts which hold it in position, while in another embodiment, two thin seal rings are employed, the latter construction permitting the elimination of numerous parts necessary when a single ring is used. In either form, the new packing differs from those heretofore used in that the seal ring is so constructed that it may be of substantially less thickness than the former rings and, as a consequence, the unit bearing pressure on the rod is lowered and wear and leakage are thereby greatly reduced.

For a better understanding of the invention, reference may be had to the accompanying drawings in which Fig. 1 is a view in longitudinal section through the packing construction of the invention;

Fig. 2 is an end view thereof;

Fig. 3 is a view on the line 3—3 of Fig. 1;

Fig. 4 is a plan view of a detail;

Fig. 5 is a view similar to Fig. 1 showing a modified construction; and

Fig. 6 is a sectional view of the construction shown in Fig. 5.

Referring now to the drawings, the end casting 10 of the compressor is illustrated as formed to provide a stuffing box through which passes rod 11. Surrounding the rod in the recess are packing cases 12, preferably of steel and having a cup-like shape. Thirteen cases are illustrated though a greater or less number may be employed, as may be required.

Disposed within each case is a ring holder 13, which is made up of a pair of semicircular parts 13—a and 13—b, these parts having abutting ends and being held in proper relation by means of a continuous retainer ring 13—c which slips over the parts and holds them positively together. The ring holder with its retainer ring has an outer diameter less than the inner diameter of that portion of the packing case in which the ring holder is disposed and the ring holder is thus free to float within the case as illustrated. Each part has a channel 14 in its inner face and in this channel is disposed a pair of rings of variable diameter lying one within the other.

The inner or seal ring 15 of the pair is made of two parts, 15—a and 15—b, the ends of which overlap with step-cut joints as illustrated in Fig. 4. This ring is made relatively thin and may, for example, be ¼" wide, while its thickness may be as little as 3/16", although slightly greater thicknesses, such as ¼", are also satisfactory. In any case, the thickness is much smaller than in rings of conventional construction, in which the thickness may be as great as 1¼". At the ends of the parts, a gap of 1/16" may be allowed for wear before the ends abut.

To prevent gas leakage at these gaps, a snap ring 16 encircles the seal ring, this snap ring being, for example ¼" wide and ⅛" thick. The outer surface of the seal ring and the inner surface of the snap ring are both ground for a perfect joint and the snap ring has a gap about ⅜" wide so located that it does not line up with the joints in the seal ring.

The ring assembly fits into the ring holder accurately and a slight contracting action may be applied to the assembly by installing a light corrugated spring 17, between the assembly and the holder.

In the construction described, the ring holder is ground and lapped to fit the rod to about 0.001". It serves much the same purpose as the "pressure breaking" ring in the former construction. The seal ring fits the rod accurately and can float at all times. Under working conditions, the cases 12 are bored on their inside diameter to a size sufficiently large to clear the rod at all times even when the rod may run out of line and low in the compressor due to wear or misalignment. This difference in diameter between packing case inside diameter and rod size causes the rings in any type of packing to overhang a certain amount and in the conventional construction causes binding due to the flexibility of the assembly. In the new construction the ring holder is wide and rigid and it is, therefore, not subject to tilting under pressure, and binding is prevented.

Extending through the cases are passages 18 through which lubricant may be supplied. In practice, it has been found that satisfactory lubrication is obtained in the construction described by supplying small quantities of oil to cases Nos. 2, 4, and 8, counting from the right in Fig. 1. Possibly introduction of oil at case No. 2 would be satisfactory since too much oil does considerable harm in building up higher pressures than are necessary, but it is advisable not to depend on a single oil pump and introduction of oil at the three cases probably results in better distribution. At the very high pressures and using a large number of cases, the oil should preferably be introduced at various points throughout the assembly for better lubrication.

In practice, the parts of the packing may be made of cast iron or special bearing metals well known in commerce. A rod of hard metal such as Nitralloy appears to give the best results for high pressure work. The number of cases required depends on various factors, and although 2,000 pounds pressure has been successfully packed with as few as six cases, a larger number is preferable, up to thirteen, particularly where the compressor is used for twenty-four hour service.

While the rings have been described as mounted in holders in cases and working on the surface of the rod, in some instances where the compressor design permits, the rings may be installed in grooves in the rod and work against a sleeve in the recess in the head casting. This arrangement is substantially the reverse of that illustrated in the drawings.

A variation of the packing above described which has given good results consists of the utilization of two seal rings, 15, to a case instead of one and the elimination of the ring holder 13 and retainer ring 13—c. This arrangement is shown in Fig. 5. The two seal rings are made so as to fill the same width as the previous assembly but with the above mentioned parts eliminated. This type of metal packing can be installed in a narrower stuffing box than the first described type.

We claim:

1. In a packing construction for the moving rod of a compressor or the like, the combination of a seal ring of variable diameter encircling and contacting with the rod, said seal ring being made up of two parts, a ring encircling the seal ring to prevent leakage between the ends of the two parts of said seal ring, a non-collapsible ring holder encircling said rings and having a channel in its inner face in which said rings are seated, a packing case for holding said ring holder and rings, said ring holder being free to move within said packing case and encircling said rod with a small clearance, and a stuffing box in which said packing case is housed.

2. In a packing construction for the moving rod of a compressor or the like, the combination of a seal ring of variable diameter through which the rod passes, a ring encircling the seal ring and holding it in contact with the rod, a non-collapsible ring holder encircling said rings and having a channel in its inner face in which said rings are seated, said ring holder encircling the rod with a small clearance, a spring interposed between the holder and said rings, a packing case for receiving said ring holder and rings, said ring holder being free to float in said case, and a stuffing box in which said packing case is housed.

3. In a packing construction for the moving rod of a compressor or the like, the combination of a seal ring encircling the rod and made up of two parts having overlapping ends, said ring having a variable inner diameter, a snap ring encircling the seal ring and holding it in contact with the rod, said snap ring also preventing leakage between the ends of the two parts of said seal ring, a non-collapsible ring holder encircling said rings and having a channel in its inner face in which said rings are seated, a packing case for receiving said ring holder and rings, said ring holder being free to float in said case, and a stuffing box in which said packing case is housed.

4. In a packing construction for the moving rod of a compressor or the like, the combination of a pair of rings of variable diameter, said rings having flat inner surfaces and being disposed one within the other with the inner ring only contacting with the rod, a ring holder of fixed inner diameter encircling said pair of rings, spacing means interposed between said ring holder and rings, a packing case for said ring holder, said ring holder floating within said case, and a stuffing box in which said packing case is housed.

5. In a packing construction for the moving rod of a compressor or the like, the combination of a pair of rings of variable diameter, said rings having flat inner surfaces and being disposed one within the other with the inner ring only contacting with the rod, a ring holder of fixed inner diameter encircling said pair of rings and fitting said rod with a small clearance, said holder comprising a pair of semi-circular parts and a retainer ring encircling said parts for holding them with their ends in contact, a packing case for said ring holder, said ring holder being free to float in said packing case, and a stuffing box in which said ring holder is housed.

6. In a packing construction for the moving rod of a compressor or the like, the combination of a self-adjusting seal ring encircling and contacting with said rod and made up of a pair of segmental parts having ends adapted to abut, said seal ring being made of thin material, a snap ring encircling the seal ring without contacting with said rod and preventing leakage between the ends of the two parts of said seal ring, a floating non-collapsible ring holder having a channel in its inner face in which said seal and snap rings are seated, said ring holder fitting the rod with a small clearance and providing support for the thin seal ring, a packing case receiving said ring holder and in which said ring holder is free to move, and a stuffing box in which said packing case is housed.

7. In a packing construction for the moving rod of a compressor or the like, the combination of a self-adjusting seal ring encircling and contacting with said rod and made up of a pair of segmental parts having ends adapted to abut, said seal ring being made of thin material, a snap ring encircling the seal ring without contacting with said rod and preventing leakage between the ends of the two parts of said sealing ring, said seal ring and said snap ring having ground contacting surfaces, a floating non-collapsible ring holder fitting said rod with a small clearance and providing suport for the thin seal ring, said ring holder having a channel in its inner face in which said snap and seal rings are received with the thin seal ring projecting out of the channel by the amount of said clearance, a packing case in which said ring holder is received and is free to move, and a stuffing box in which said packing case is housed.

8. In a packing construction for the moving rod of a compressor or the like, the combination of a self-adjusting seal ring encircling and having a flat inner surface contacting with said rod and made up of a pair of segmental parts having ends adapted to abut, said seal ring being made of thin material, a snap ring encircling the seal ring without contacting with said rod and preventing leakage between the ends of the two parts thereof, spring means for acting on the snap ring to hold it against said seal ring, a floating non-collapsible ring holder having a channel in its inner face in which said seal and snap rings and spring means are received, said ring holder fitting the rod with small clearance and said thin seal ring being supported by said ring holder except to the extent of said clearance, a packing case in which said ring holder is received and free to move, and a stuffing box in which said packing case is housed.

9. In a packing construction for the moving rod of a compressor or the like, the combination of a self-adjusting seal ring encircling and contacting with said rod and made up of a pair of segmental parts having ends adapted to abut, said seal ring being made of thin material, a snap ring encircling the seal ring and preventing leakage between the ends of the two parts thereof, a floating non-collapsible ring holder having a channel in its inner face in which said seal and snap rings are seated, said ring holder being made of a pair of segmental parts having abutting ends, said parts fitting said rod closely and with small clearance and said thin seal ring being supported by said ring holder except to the extent of said clearance, a retainer ring encircling the two parts of said ring holder to retain them in position, a packing case in which said ring holder with its retainer ring and said snap and seal rings are free to move, and a mounting for said packing case.

10. In a packing construction for the moving rod of a compressor or the like, the combination of a thin seal ring encircling and contacting with said rod, said seal ring being of variable diameter and made of two segmental parts, a snap ring encircling said seal ring and preventing leakage between the ends of the two parts thereof, a ring holder made up of two segmental parts having abutting ends, said ring holder having a channel in its inner face in which said snap and seal rings are received and supported, said ring holder fitting said rod with a clearance of the order of .001" to .002", a retainer ring for holding the two parts of said ring holder with their ends in contact, a packing case in which said ring holder and rings are received, a mounting for said packing case, and means for supplying lubricant to said rod through said packing case.

HOWARD A. SOMMERS.
GEORGE J. McINNIS.